United States Patent
Maron et al.

(10) Patent No.: US 6,317,555 B1
(45) Date of Patent: Nov. 13, 2001

(54) CREEP-RESISTANT OPTICAL FIBER ATTACHMENT

(75) Inventors: Robert J. Maron, Cromwell; Guy A. Daigle, Plainville; James R. Dunphy, South Glastonbury; Thomas W. Engel, Manchester; John J. Grunbeck, Northford; Mark R. Fernald, Enfield; Charles W. Helm, Rocky Hill, all of CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/073,701

(22) Filed: May 6, 1998

(51) Int. Cl.[7] ................................................. G02B 6/02
(52) U.S. Cl. ............................ 385/137; 385/86; 385/87; 385/136
(58) Field of Search ........................... 385/76–87, 136, 385/137, 12, 13; 250/227.14, 227.18

(56) References Cited

U.S. PATENT DOCUMENTS

| | | | |
|---|---|---|---|
| 4,148,553 | * 4/1979 | Asam | 385/85 |
| 4,163,370 | 8/1979 | Kurth | 65/2 |
| 4,296,996 | * 10/1981 | Niiro et al. | 385/138 |
| 4,708,429 | * 11/1987 | Clark et al. | 385/91 |
| 4,915,467 | 4/1990 | Berkey . | |
| 5,321,790 | 6/1994 | Takahashi et al. | 385/140 |
| 5,461,926 | 10/1995 | Bobb et al. | 73/800 |
| 5,512,078 | 4/1996 | Griffin | 65/484 |
| 5,578,106 | 11/1996 | Fleming, Jr. et al. | 65/391 |
| 5,594,824 | * 1/1997 | Kerndlmaier | 385/49 |
| 5,661,832 | * 8/1997 | Yonemura | 385/88 |
| 5,745,626 | 4/1998 | Duck et al. | 385/96 |

FOREIGN PATENT DOCUMENTS

| | | |
|---|---|---|
| 0316473 | 11/1987 | (EP) . |
| 0487151 | 11/1991 | (EP) . |
| 2068142A | * 8/1981 | (GB) . |
| 55-0043524A | * 3/1980 | (JP) . |
| 57-0066405A | * 4/1982 | (JP) . |
| 60-0060608A | * 4/1985 | (JP) . |
| 63-0163415A | * 7/1988 | (JP) . |
| WO9107355 | 5/1991 | (WO) . |
| WO9944026 | 9/1999 | (WO) . |

OTHER PUBLICATIONS

Japanese Abstract: Publication No. 57027211, dated Feb. 13, 1982, Title: Fiber Mode Scrambler.

Japanese Abstract: Publication No. 57001289, dated Jan. 6, 1982, Title: Semiconductor Light Emitting Device.

Japanese Abstract: Publication No. 04027903, dated May 23, 1990, Title: Optical Fiber Polarizer and Production Thereof.

* cited by examiner

Primary Examiner—Rodney Bovernick
Assistant Examiner—Michael J. Stahl

(57) ABSTRACT

A creep-resistant optical fiber attachment includes an optical fiber 10, having a cladding 12 and a core 14, having a variation region 16 (expanded or recessed) of an outer dimension on of the cladding and a structure, such as a ferrule 30, disposed against least a portion of the variation region 16. The fiber 10 is held in tension against the ferrule and the ferrule 30 has a size and shape that mechanically locks the ferrule 30 to the variation 16, thereby holding the fiber 10 in tension against the ferrule 30 with minimal relative movement (or creep) in at least one axail direction between the fiber 10 and the ferrule 30. The ferrule 30 may be attached to or part of a larger structure, such as a housing. The variation 16 and the ferrule 30 may have various different shapes and sizes. There may also be a buffer layer 18 between the cladding 12 and the ferrule 30 to protect the fiber 10 and/or to help secure the ferrule 30 to the fiber 10 to minimize creep.

51 Claims, 4 Drawing Sheets

CREEP-RESISTANT OPTICAL FIBER ATTACHMENT

CROSS REFERENCES TO RELATED APPLICATIONS

Copending U.S. Pat. applications, Ser. No. 09/073,700 (now abandoned), entitled "Optical Fiber Bulge", and Ser. No. 09/073,699 (now abandoned), entitled "Optical Fiber Outer Dimension Variation", both filed contemptously herewith, contain subject matter related to that disclosed herein.

TECHNICAL FIELD

This invention relates to optical fibers and more particularly to creep-resistant optical fiber attachment techniques.

BACKGROUND ART

Sensors for the measurement of various physical parameters such as pressure and temperature often rely on the transmission of strain from an elastic structure (e.g., a diaphragm, bellows, etc.) to a sensing element. In a pressure sensor, the sensing element may be bonded to the elastic structure with a suitable adhesive.

It is also known that the attachment of the sensing element to the elastic structure can be a large source of error if the attachment is not highly stable. In the case of sensors which measure static or very slowly changing parameters, the long term stability of the attachment to the structure is extremely important. A major source of such long term sensor instability is a phenomenon known as "creep", i.e., change in strain on the sensing element with no change in applied load on the elastic structure, which results in a DC shift or drift error in the sensor signal.

Certain types of fiber optic sensors for measuring static and/or quasi-static parameters require a highly stable, very low creep attachment of the optical fiber to the elastic structure. One example of a fiber optic based sensor is that described in U.S. Pat. No. 6,016,702 entitled "High Sensitivity Fiber Optic Pressure Sensor for Use in Harsh Environments" to Robert J. Maron, which is incorporated herein by reference in its entirety. In that case, an optical fiber is attached to a compressible bellows at one location along the fiber and to a rigid structure (or housing) at a second location along the fiber with a Bragg grating embedded within the fiber between these two fiber attachment locations. As the bellows is compressed due to an external pressure change, the strain on the fiber grating changes, which changes the wavelength of light reflected by the grating. If the attachment of the fiber to the structure is not stable, the fiber may move (or creep) relative to the structure it is attached to, and the aforementioned measurement inaccuracies occur.

One common technique for attaching the optical fiber to a structure is epoxy adhesives. It is common to restrict the use of epoxy adhesives to temperatures below the glass transition temperature of the epoxy. Above the glass transition temperature, the epoxy transitions to a soft state in which creep becomes significant and, thus, the epoxy becomes unusable for attachment of a sensing element in a precision transducer. Also, even below the glass transition temperature significant creep may occur.

Another technique is to solder the structure to a metal-coated fiber. However, it is known that solders are susceptible to creep under certain conditions. In particular, some soft solders, such as common lead-tin (PbSn) solder, have a relatively low melting point temperature and are thus relatively unsuitable for use in transducers that are used at elevated temperatures and/or at high levels of stress in the solder attachment. The use of "hard" solders with higher melting temperatures, such as gold-germanium (AuGe) and gold-silicon (AuSi), can reduce the problem; however, at elevated temperatures and/or high stress at the solder attachment, these hard solders also exhibit creep. In addition, the high melting temperature of such solders may damage the metal coating and/or damage the bond between the metal coating and glass fiber.

SUMMARY OF THE INVENTION

Objects of the present invention include provision of a creep-resistant attachment of a structure to an optical fiber.

According to the present invention, an apparatus for attaching to an optical fiber, comprising a core and a cladding disposed outside of the core; the fiber having a variation of an outer dimension of the cladding; a structure, disposed against at least a portion of the variation, for minimizing relative movement in at least one axial direction between the fiber and the structure; the fiber being held in tension against the structure; and the fiber extending axially from opposite axial ends of the structure.

According further to the present invention, the variation comprises an expanded region. According still further to the present invention, the variation is a recessed region.

According still further to the present invention, the attachment means comprises a ferrule. According still further to the present invention, the waveguide is an optical fiber. According still further to the present invention, the waveguide further comprises a buffer layer disposed between the attachment means and the waveguide.

The present invention provides a significant improvement over the prior art by combining an optical fiber having an expanded and/or recessed outer dimension variation region, with a structure, such as a ferrule or housing, having a size and shape such that the structure mechanically locks against at least a portion of the variation, thereby allowing the structure to hold the fiber in tention with minimal relative movement (or creep) in at least one predetermined direction between the fiber and the structure. The variation region and the structure may have various different shapes and sizes. When no adhesives are used, the structure may be easily detached from the variation. There may also be a buffer layer between the cladding and the ferrule to protect the fiber and/or to help secure the structure to the fiber to minimize creep. Adhesives, such as solders, brazes, epoxies, etc., may also be used between the structure and the variation region.

The foregoing and other objects, features and advantages of the present invention will become more apparent in light of the following detailed description of exemplary embodiments thereof.

BEST MODE FOR CARRYING OUT THE INVENTION

Figure 1:
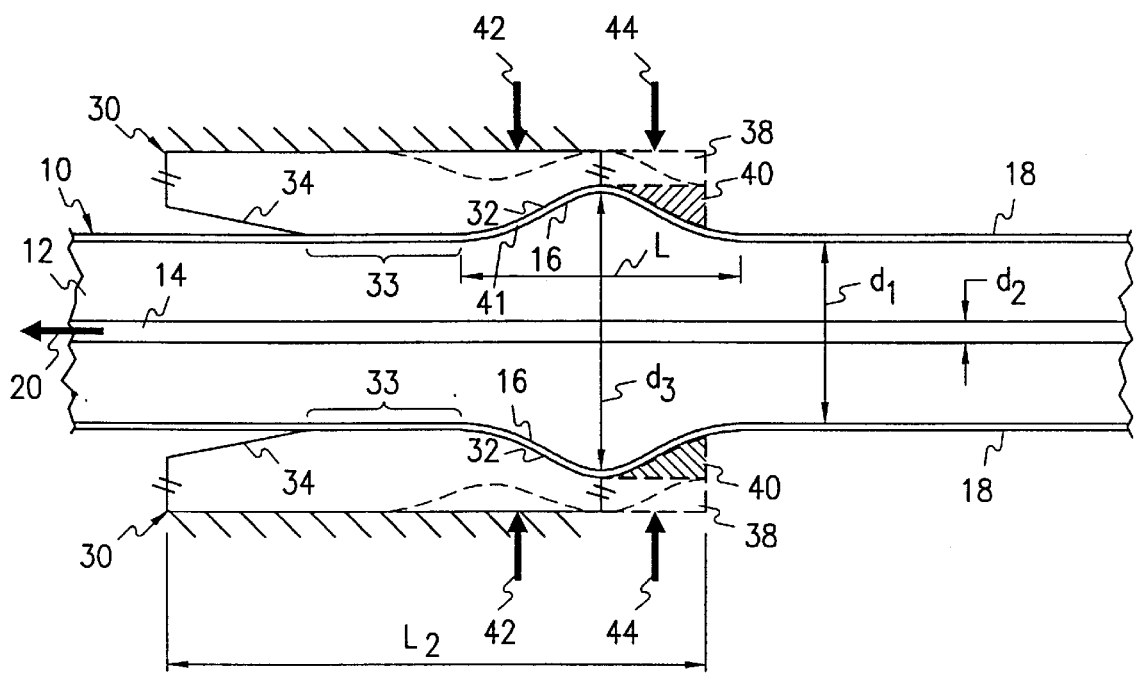
FIG. 1 is a side view cross-section of an optical fiber with an increased diameter region and a ferrule adjacent thereto, in accordance with the present invention.

Referring to FIG. 1, an optical waveguide 10, e.g., a known single mode optical fiber, has a cladding 12 having an outer diameter d1 of about 125 microns and a core 14 having a diameter d2 of approximately 7–10 microns (e.g., 9 microns). The fiber 10 is designed to propagate light along the core 14 of the fiber 10. The cladding 12 and the core 14 are made of fused silica glass or doped silica glasses. Other materials for the optical fiber or waveguide may be used if desired. The fiber 10 has a region 16 with an expanded (or increased) outer diameter (or dimension). The expanded region 16 has a length L of about 500 microns, and an outer diameter d3 of about 200 microns. Other dimensions of the cladding 12, core 14, and expanded region 16 may be used if desired, provided the diameter d3 of the expanded region 16 is greater than the diameter d1. Also, the fiber 10 may have an outer coating or buffer layer 18 used to protect the fiber and/or enhance attachment to the fiber (discussed more hereinafter).

Instead of an optical fiber, any optical waveguide having a core and cladding may be used, e.g., a flat or planar waveguide, on which the region 16 can be created. In the case of a flat or planar waveguide, the region 16 may be on the upper and/or lower surfaces, and/or side dimensions of the waveguide. Also, a multi-mode optical waveguide may be used if desired. Further, precise axial symmetry of the region 16 is not required for the present invention. For example, the lower portion of the expanded region 16 may be slightly larger than the upper portion, or vise versa.

The region 16 may be made by any technique for making a variation in an outer dimension of a waveguide. Some techniques for making the region 16 are described in Copending U.S. Pat. applications, Ser. No. 09/073,700 (now abandoned), "Optical Fiber Bulge", and Ser. No. 09/073,699 (now abandoned), entitled "Optical Fiber Outer Dimension Variation", both filed contempraneously herewith. The region 16 allows the fiber 10 to be attached to a structure in many different ways, as described hereinafter with FIGS. 1–8.

In particular, referring to FIG. 1, a ferrule 30 (or sleeve) may be butted (or mated) against at least a portion of the expanded region 16 to provide a mechanical stop (or lock) which substantially prevents the fiber 10 from moving to the left relative to the ferrule 30 as indicated by a line 20 (i.e., the direction of an applied load on the fiber 10). The ferrule 30 may have a generally cylindrical and/or conical shape, or other shapes as discussed more hereinafter. The ferrule 30 may also overlap all or a portion of the expanded region 16. It is not required for the ferrule 30 to overlap the expanded region 16; however, overlap reduces point contact stresses on the fiber/expanded region, to reduce the possibility of cracking the glass of the fiber 10 and/or the expanded region 16 particularly when the expanded region 16 has a curved geometry.

Referring to FIG. 1, the ferrule 30 has a front region 32 with a geometry (shape, contour, or profile) that substantially corresponds to the geometry of the expanded region 16. The shape of the region 32 need not exactly match that of the expanded region 16, and may be a straight taper or bevel instead of a curved surface. Also, the ferrule 30 may have a beveled section 34 to provide some stress relief on the fiber when the fiber 10 flexes or is pulled off-axis from the ferrule 30. Instead of the taper 34, the ferrule 30 may be terminated with a sharp perpendicular edge if desired.

The ferrule 30 may be butted directly against the expanded region 16 or may be bonded to the fiber 10 and/or the expanded region 16 with an adhesive material discussed hereinafter. The ferrule 30 may be pre-formed such that the shape of the front region 32 substantially conforms to the geometry of the expanded region 16. However, if the shape of the ferrule 30 does not match that of the expanded region 16, a material, e.g., an adhesive, a coating and/or a filler (discussed more hereinafter), may be used to fill any gaps therebetween to reduce point contact stresses on the fiber/expanded region and/or to provide bonding therebetween.

Alternatively, the ferrule 30 may be heated and/or pressure (or force) applied to the ferrule 30, e.g., by atmospheric (such as pressure and/or vacuum), mechanical (such as crimping), and/or magnetic techniques (such as electromagnetic forming), or any other technique, as indicated by arrows 42, to cause the ferrule 30 to match at least a portion of the geometry of the expanded region 16. For a glass ferrule, the ferrule 30 may be heated to a temperature at or below the softening temperature of the glass. For a metal ferrule, the ferrule may be heated to a temperature where the metal can be shaped. Alternatively, the ferrule 30 may be heated, held in place, and the fiber 10 pulled longitudinally toward and into contact with the ferrule 30 to force the ferrule 30 to conform to the shape of the variation region 16. This is particularly useful when the ferrule 30 is made of a metal, which has a much lower softening temperature than the glass, but may be used for any ferrule material.

Alternatively, the ferrule 30 may have a section 38 which extends to the right of and overhangs the right side of the expanded region 16. In that case, the region 40 between the inside of the ferrule 30 and the right side of the expanded region 16 may be partially or completely filled with an adhesive, e.g., solder, braze, epoxy, etc., similar to those discussed hereinafter. The adhesive may also fill any gaps on the left side of the region 16 along the region 32. In that case, to help minimize creep, the adhesive should be localized to the fiber variation region 16, and thus avoiding putting the adhesive in a region 33 will help avoid creep in the region 33. Instead of filling the region 40 with an adhesive, the section 38 may be heated and/or pressure (or force) applied to the section 38 (using any of the techniques discussed hereinbefore with the arrows 42), as indicated by arrows 44, to force the ferrule section 38 to conform to at least a portion of the right side of the expanded region 16. Also, such heating and/or applying of pressure (or force) may be performed on the regions 32,38 together, e.g., with a single crimping tool, coining tool, or the like.

The ferrule 30 may be made of a ceramic/glass (e.g., sapphire, ruby, fused quartz, fused silica, etc.), a metal (e.g., Invar (64% Fe, 36% Ni alloy), or Kovar (54% Fe, 29% Ni, 17% Co)), or other low thermal expansion materials. The thermal expansion coefficient of the ferrule 30 should be close to that of the optical fiber 10 so that the geometry of the ferrule 30 and the expanded region 16 and/or the fiber 10 will substantially track each other over temperature to minimize creep and point contact stresses. If the optical fiber comprises silica glass (and thus has a low thermal expansion), a low thermal expansion material is desirable for the ferrule 30. Other optical fiber or waveguide materials may be used if desired, with the material for ferrule 30 being selected to have a substantially similar thermal expansion coefficient.

For any of the embodiments described herein, the ferrule 30 may be bonded to the fiber 10 and/or expanded region 16 using epoxy, metal solders, metal brazes, glass solders, ceramic adhesives, or other adhesive materials depending on the ferrule material, the fiber material, and whether or not there is the outer buffer layer (or coating) 18 on the cladding 12 of the fiber 10. Alternatively, as discussed hereinbefore, the ferrule may be butted-up against the region 16 without any adhesives.

Also, the buffer layer 18 (if used) may be made of various materials, e.g., metal, polymer, teflon, and/or carbon, or other materials, and may comprise a plurality of layers. The buffer layer 18 may be used to protect the fiber, and/or enhance attachment of the ferrule 30 to the fiber (e.g., reduce creep). The buffer layer 18 may comprise a metal layer (or metalized coating) made of a material that is rigid enough to protect the outer surface of the fiber to help prevent fiber breakage at or near the region 16. The metal layer may also be a material that is malleable (i.e., a material that deforms plastically under a compressive load) that can sustain local compressive loads and exhibits high plastic strain without material failure, (e.g., tearing, forming voids, etc.) which helps the ferrule 30 conform to the geometry of the region 16. Some such malleable metals include gold, platinum, nickel, etc. Also, the metal layer may be used to promote glass surface wetting for solders.

For example, the buffer layer 18 may be made of nickel-gold (NiAu), having a thickness of about 1–3 microns Ni on the fiber and about 70–150 nanometers Au on the nickel, or thicker Au, e.g., about 1–10 microns, may be used. Such a buffer layer 18 may be used with metal solder to solder the ferrule 30 to the layer 18, or may be used without any solder (where the ferrule is butted-up against the region 16). Other metals and thicknesses may be used for the metal layer.

Alternatively, the buffer layer 18 may comprise a layer of polymer (e.g., high temperature polyimide) having a thickness of about 1–10 microns over the metal layer or directly on the cladding 12 without the metal layer. Other types of polymers and thicknesses may be used. When a polymer is used, it may be necessary to heat the combined fiber/variation/ferrule at an elevated temperature (e.g., at or above the operating temperature for the application) for a settling time, to allow the polymer to reach a steady state condition, e.g., thickness, shape, displacement, etc., and thus exhibit minimal creep. Other thicknesses, number of layers, materials and compositions of the layers of the buffer layer 18 may be used.

Also, the ferrule 30 may have an inner diameter coating 41 of one or more of the aforementioned malleable material (s), to help the ferrule 30 to conform to the geometry of the expanded region 16, thereby reducing point contact stresses on the fiber, and/or to enhance bonding to the buffer layer 18 or to the fiber 10. Such an inner coating on the ferrule 30 may be used whether or not the buffer layer 18 on the fiber 10 is used, and whether or not the ferrule 30 is soldered to the fiber 10 or the expanded region 16. Also, the inner diameter of the ferrule 10 may be polished to reduce stress concentrations.

The ferrule 30 may be a one-piece ferrule, or a semi-circular two or more piece ferrule. Using a multi-piece ferrule provides the advantage of not having to slide the ferrule 30 along the fiber 10 to the region 16, thereby reducing the possibility of scratching or causing other damage to the outer surface of the fiber 10 (with or without the buffer coating 18) and allowing the buffer layer 18 away from the region 16 to be thicker and/or non-uniform.

Figure 2:
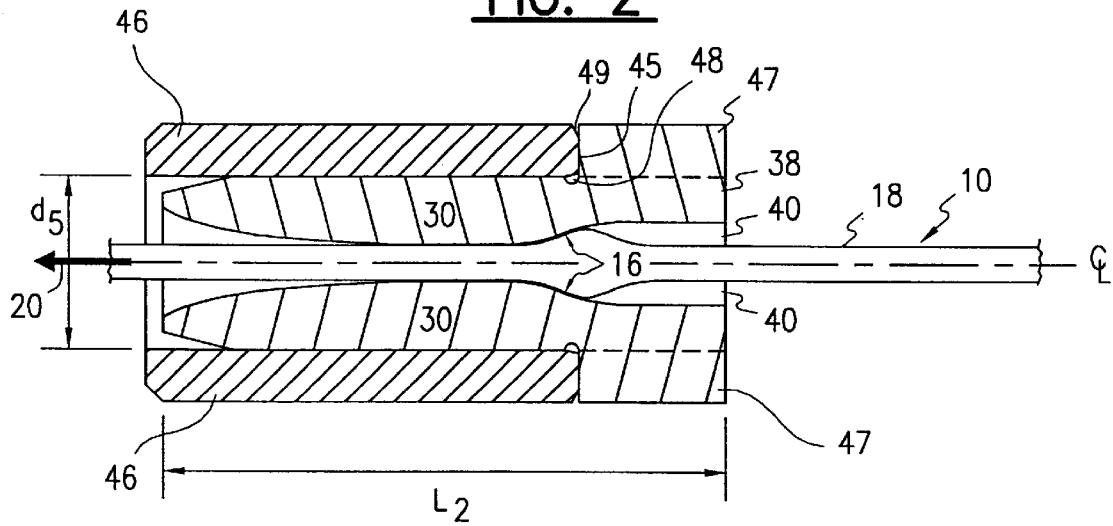
FIG. 2 is a side view cross-section of an optical fiber with an increased diameter region and a ferrule adjacent thereto, in accordance with the present invention.

Referring to FIG. 2, in an alternative design of the ferrule 30, the section 38 extends to the right of and overhangs the right side of the expanded region 16 and some of the fiber 10. If the ferrule 30 is a multi-piece ferrule, to hold such a ferrule together (around the fiber 10 and/or the region 16), the ferrule 30 may be self-locking, may be hinged (like a clam-shell), and/or a collar 46 may be used. The collar 46 may have a substantially straight inner diameter d5, of, e.g., 0.022 inches, which substantially matches or is slightly less than the outer diameter of the ferrule 30 to provide a contacting or frictional fit between the collar 46 and the ferrule 30. Other ferrule and collar diameters or dimensions may be used if desired. Also, the ferrule 30 may have an enlarged region 47 to provide a stop for the collar 46 or for other purposes. Further, the ferrule 30 may have a recessed region 48 to allow for the collar 46 and ferrule 30 to mate flush at a face 45. Also, a slight bevel 49 may be provided on the collar 46 or the ferrule 30 to allow a tool, e.g., a razor blade, to be inserted to separate the collar 46 from the ferrule 30. The collar 46 may be made of the same material as the ferrule 30, or a material with substantially the same thermal expansion coefficient. Alternatively, the collar 46 may be made of heat shrinking materials such as metals, polymers, or shape memory alloys. To facilitate assembly of the multipiece ferrule 30 onto the fiber 10, the multi-piece ferrule 30 may be placed into the collar 46 and then slid along the fiber 10 to the region 16. Then, heating and/or applying pressure (or force) to the collar 46 (such as discussed hereinbefore with FIG. 1 with the ferrule 30) will cause at least a portion of the ferrule 30 to lock onto at least a portion of the region 16.

The length L2 of the ferrule 30 is about 0.075 inches. Other longer or shorter lengths may be used for the ferrule 30.

Figure 3:
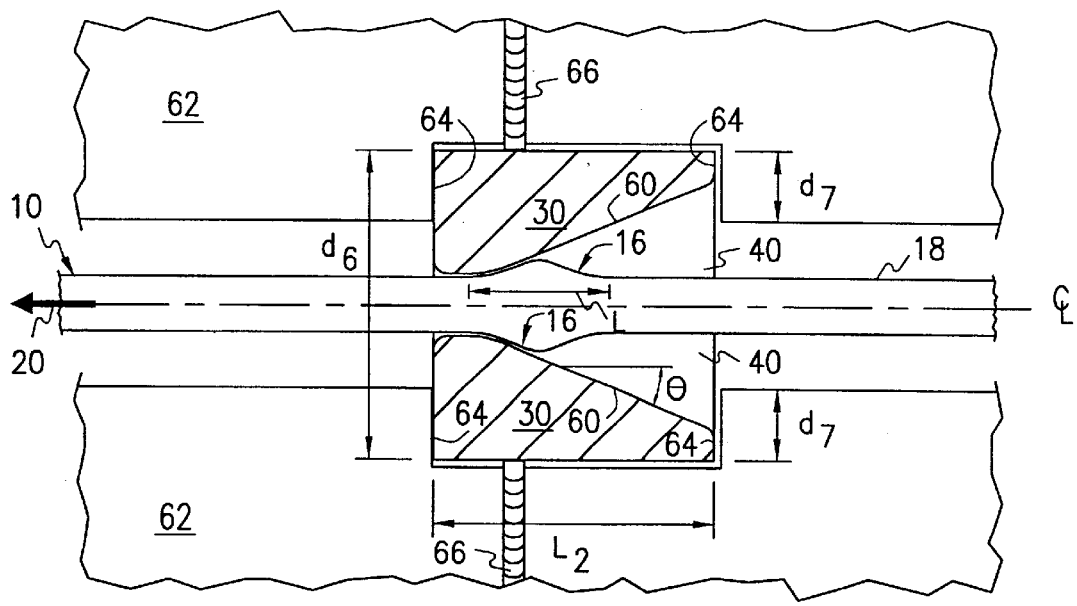
FIG. 3 is a side view cross-section of an optical fiber with an increased diameter region and a ferrule adjacent thereto, in accordance with the present invention.

Referring to FIG. 3, instead of the ferrule 30 having a long cylindrical shape it may be shorter and/or wider and may resemble a washer, bead or bearing jewel. For example, the ferrule 30 in FIG. 3 has an outer diameter d6 of about 0.033 inches and a length L2 of about 0.031 inches with a tapered or beveled region 60 with a taper angle θ of about 13 degrees that extends beyond and overhangs at least a portion of the expanded region 16. The region 40 between the bottom side of the ferrule 30 and the right side of the expanded region 16 (and a portion of the fiber 10) may optionally be partially or completely filled with an adhesive, e.g., solder, braze, epoxy, etc., as discussed hereinbefore. The adhesive may also fill any gaps on the left side of the region 16. Other diameters, lengths and taper angles may be used. Also, the length of the tapered region 60 may be shorter or there need not be any tapered region. The ferrule 30 may also be disposed within a housing 62, as discussed more hereinafter.

Figure 4:
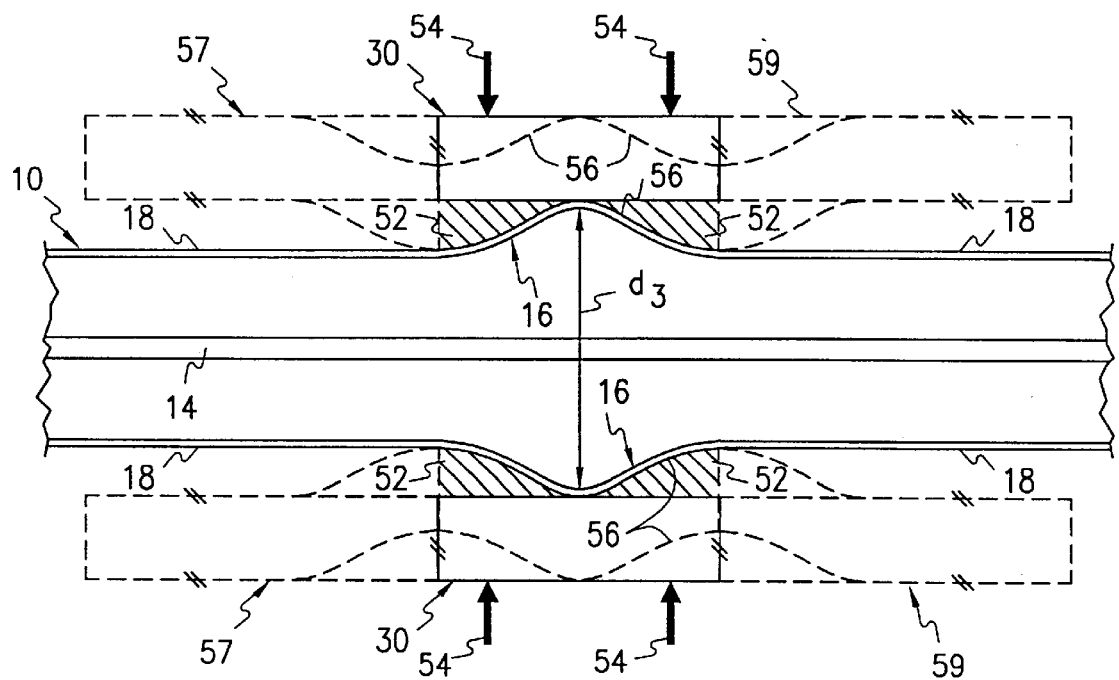
FIG. 4 is a side view cross-section of an optical fiber with an increased diameter region and a ferrule straddling the region, in accordance with the present invention.

Referring to FIG. 4, alternatively, the ferrule 30 may be placed (or straddled) across the expanded region 16. In that case, the ferrule 30 may have a straight (cylindrical) inside diameter which is larger than, or equal to the diameter d3 of the expanded region 16 plus the thickness of the coating 18 (if used). In that case, regions 52 between the bottom side of the ferrule 30 and one or both sides of the expanded region 16 may be partially or completely filled with an adhesive, e.g., solder, braze, epoxy, etc., similar to those discussed hereinbefore. Alternatively, the ferrule 30 may be heated and/or pressure (or force) applied, e.g., by atmospheric (such as pressure and/or vacuum), mechanical (such as crimping), and/or mechanical techniques, or any other techniques, across one or both sides of the expanded region 16 as indicated by arrows 54 which causes the ferrule 30 to conform to and be against at least a portion of the expanded region 16, as indicated by the dashed line profile 56.

The ferrule 30 may be much longer than that shown in FIG. 4 to the right (as indicated by dashed lines 59) or to the left (as indicated by dashed lines 57) or along both sides, of the region 16, if desired. In that case, the ferrule 30 may be locally deformed to conform to one or both sides of the region 16. Also, if one or both sides of the ferrule 30 are made to conform to the region 16, one or more of the aforementioned adhesives may also be used. Also, such heating and/or applying of pressure (or force) may be performed on the left and/or right sides of the region 16 together, e.g., with a single crimping tool, coining tool, or the like.

Figure 5:
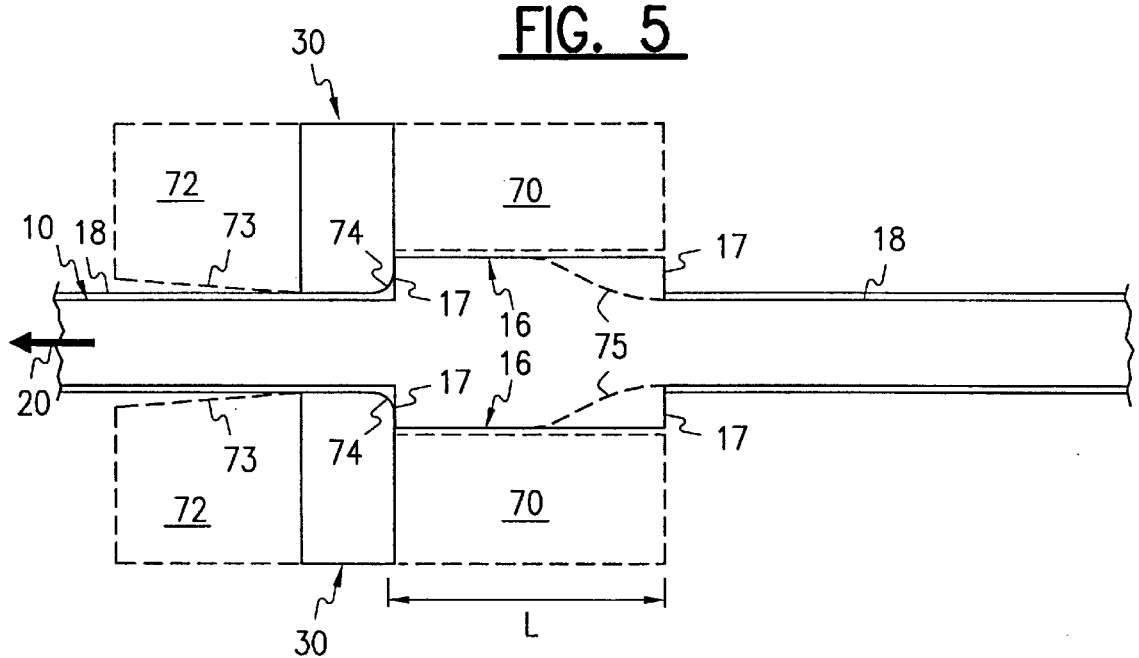
FIG. 5 is a side view cross-section of an optical fiber with an increased diameter region and a ferrule adjacent thereto, in accordance with the present invention.

Referring to FIG. 5, in the event that the expanded region 16 has a straight geometry, such as that shown by the lines 17, the ferrule 30 may be disposed adjacent to (or against) at least one of the vertical edges 17 of the expanded region 16. In that case, the ferrule 30 may have a region 70 that overlaps all or a portion of (or overhang beyond) the top of the expanded region 16, and/or a region 72, that extends on the opposite side of the ferrule, which may have a tapered section 73 as discussed hereinbefore with FIGS. 1 and 2. Also, a corner 74 of the ferrule 30 may be rounded to minimize damage to the outer surface of the fiber or coating 18 (if used), if the ferrule 30 is slid along the fiber to the expanded region 16. Alternatively, instead of having the vertical edge 17 on both sides of the expanded region 16, the side of the expanded region 16 opposite from where the ferrule 30 contacts the edge 17 (e.g., the right side) may be rounded or another geometry as indicated by the dashed lines 75.

Figure 6:
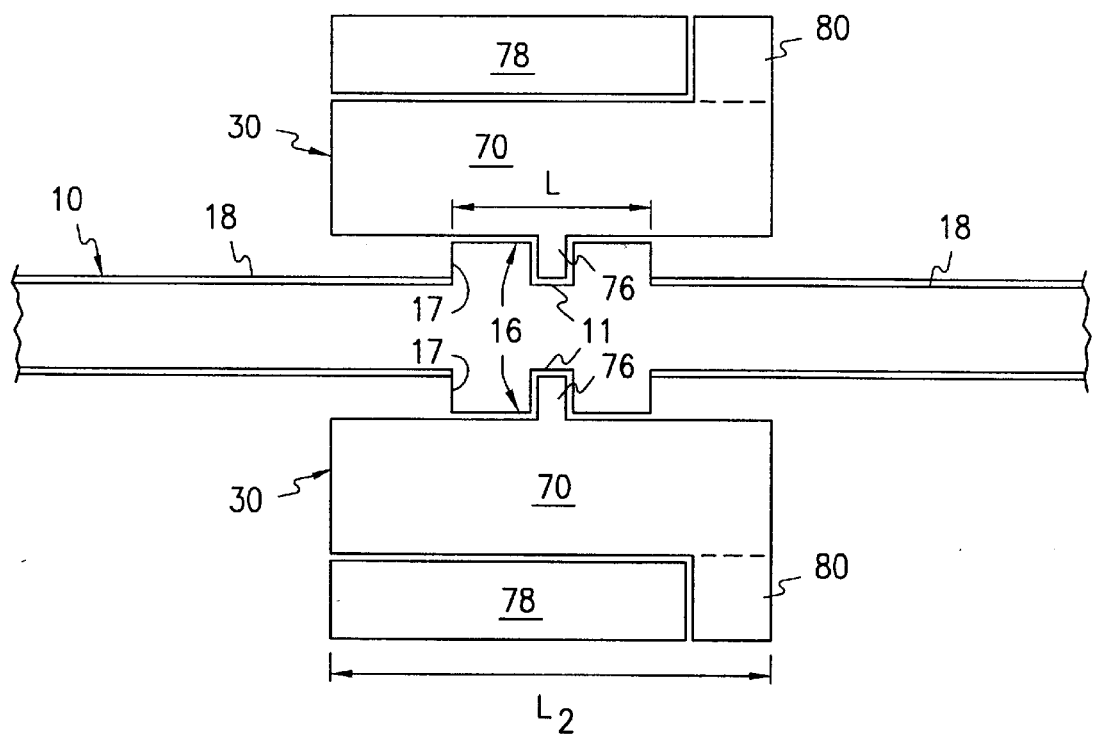
FIG. 6 is a side view cross-section of an optical fiber with an increased diameter region and a ferrule adjacent thereto, in accordance with the present invention.

Referring to FIG. 6, in the event that the expanded region 16 has a notch 11, the ferrule 30 may have an inwardly protruding section (or tooth) 76 which fits within the notch 11 to lock the fiber 10 to the ferrule 30. Also, the ferrule 30 may be a multi-piece ferrule (such as that discussed hereinbefore). In that case, to hold the ferrule 30 together, the ferrule 30 may be self-locking or there may be a collar 78 around the ferrule 30. Also, there may be a raised section 80 (at either end of the ferrule 30) to provide a stop for the collar 78 or for other purposes. The notch 11 need not be centered along the expanded region 16, and the size of the tooth 76 need not match the dimensions (e.g., length, depth) of the notch 11. Also, there may be more than one notch 11 and tooth 76. Further, the length L2 of the ferrule 30 may extend beyond the length L of the expanded region 16, but is not required to.

Figure 7:
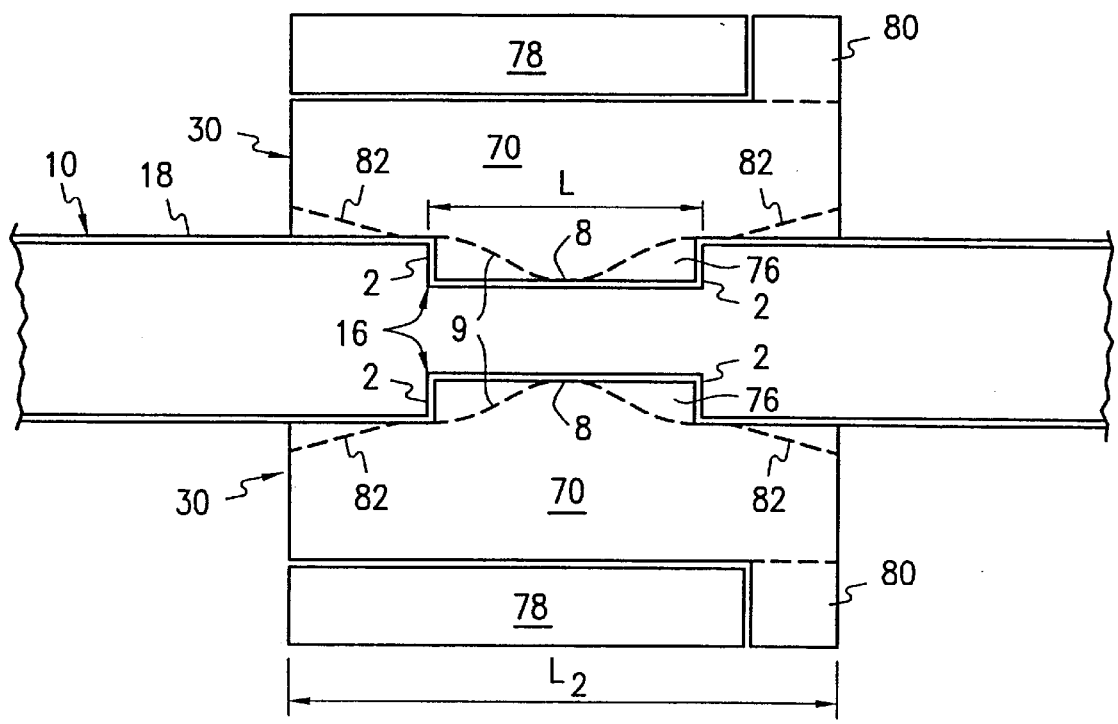
FIG. 7 is a side view cross-section of an optical fiber with a decreased diameter region and a ferrule adjacent thereto, in accordance with the present invention.

Referring to FIG. 7, alternatively, if the region 16 comprises a recess 8, the tooth 76 of the ferrule 30 would be sized to substantially match at least a portion of the geometry of the recess 8. For example, if the geometry of the recess 8 is curved, as indicated by the dashed lines 9, the tooth 76 of the ferrule 30 would likely also be curved. If the geometry of the recess 8 has sharp edges 2, the tooth 76 may likely have at least one sharp edge to match at least one of the edges 2. Also, the length of the tooth 76 may be shorter than the length L of the recess 8. Further, the length L2 of the ferrule 30 may be longer than the length L of the recess 8. In that case, there may be one or more tapered surfaces 82, similar to that discussed hereinbefore, to reduce fiber stresses.

Figure 8:
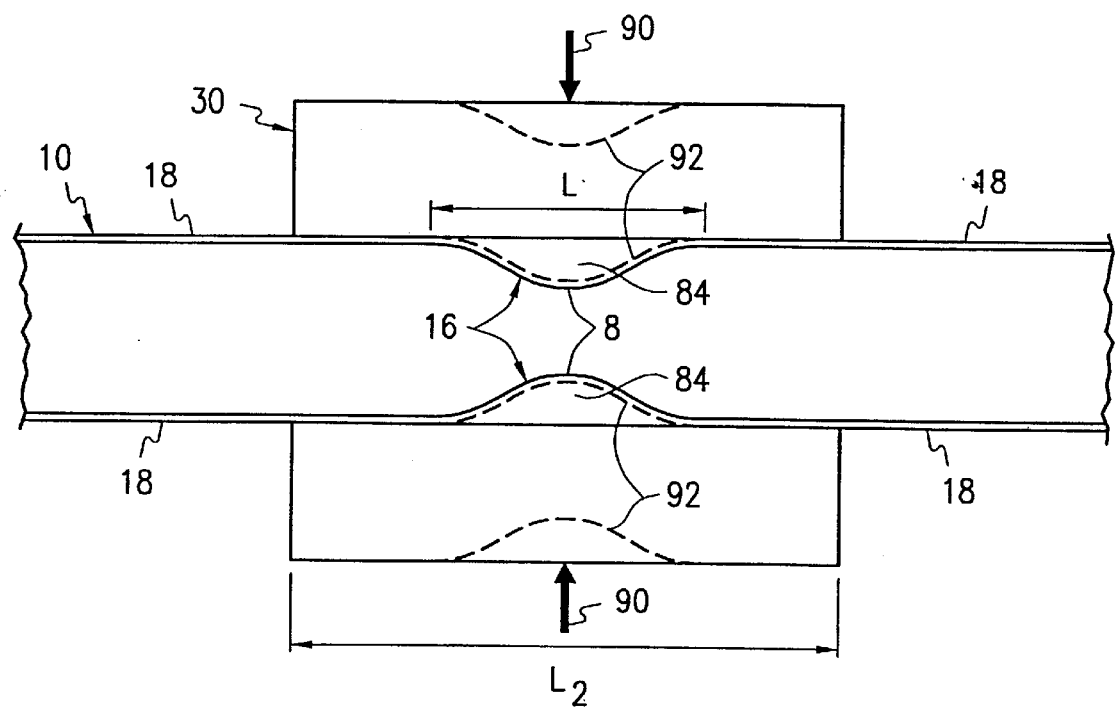
FIG. 8 is a side view cross-section of an optical fiber with a decreased diameter region and a ferrule adjacent thereto, in accordance with the present invention.

Referring to FIG. 8, alternatively, if the region 16 has the recess 8, the ferrule 30 may be a single or multi-piece cylindrical tube (or sleeve) which is placed (or slid) over the recess 8. In that case, a region 84 between the inside of the ferrule 30 and the outside of the recess 8 may be partially or completely filled with an adhesive, e.g., solder, braze, epoxy, etc., similar to those discussed hereinbefore. Instead of using an adhesive, the ferrule 30 may be heated and/or pressure applied across the recess 8, e.g., by atmospheric (such as pressure and/or vacuum), mechanical (such as crimping), and/or magnetic techniques (such as electromagnetic forming), or any other technique, as indicated by arrows 90, which causes the ferrule 30 to conform to at least a portion of the shape of the recess 8, as indicated by the dashed line profile 92. For a glass ferrule, the ferrule 30 may be heated to a temperature at or below the softening temperature of the glass. For a metal ferrule, the ferrule may be heated to a temperature where the metal can be shaped.

The ferrule 30 of any of the embodiments discussed herein may be connected to or part of a structure (or housing), as discussed hereinbefore in the Background Art section hereto. Various techniques for attaching the ferrule 30 to the structure may be used, which depend on the application and the material of the ferrule 30.

For example, referring to FIG. 3, a housing 62 may surround at least a portion of the ferrule 30 to hold the ferrule 30 in a predetermined position. The housing 62 has a notch 64 which is substantially the same length or longer than the length L2 of the ferrule 30. The depth d7 of the notch 64 is deep enough to hold the ferrule 30 from moving axially (in at least one direction). Also the depth d7 may be deep enough to almost touch the fiber 10 (which may reduce non-axial motion of the fiber 10). The shape of the housing 62 and the notch 64 may be cylindrical, rectangular or any other shape that allows the notch 64 to hold the ferrule 30. The housing 62 may also be bonded to the ferrule 30 using an adhesive discussed hereinbefore (e.g., solder, braze, epoxy, etc.). Also, the housing 62 may be anchored to the ferrule 30 by mechanical means, such as one or more set screws 66. Other techniques for attaching the ferrule 30 to the housing 62 may be used. The housing 62 may be used with any of the ferrules 30 discussed herein with suitable changes for the ferrule geometry.

It should be understood that the Figs. shown herein (except for FIGS. 2 and 3) are not drawn to scale.

For any of the embodiments described herein, the region 16 may have other shapes (or geometries) than those described herein, provided at least a portion of the optical waveguide has a variation (or deformation or change) of an outer dimension (expanded and/or recessed) of the waveguide 10. The expanded and recessed regions 16 may be combined to provide an expanded outer diameter region and a reduced diameter region. Also, the ferrule 30 may have other shapes, sizes, and/or designs than those described herein, that has at least a portion of the ferrule 30 that mechanically locks, stops, or otherwise is disposed against at least a portion of the variation region 16, so as to minimize (or substantially prevent) relative movement (or creep) in at least one direction between the fiber 10 and the ferrule 30 (i.e., substantially prevents the fiber 10 from moving in a predetermined direction relative to the ferrule 30 and substantially prevents the ferrule 30 from moving in a direction opposite to the predetermined direction relative to the fiber 10), which causes the fiber 10 to substantially track movement of the ferrule 30. Also, the ferrule 30 may be placed against the right side of the expanded region 16 instead of, or in addition to, the left side of the expanded region 16.

Also, instead of a ferrule 30, the region 16 may be placed in a housing or any other structure having an internal shape that mechanically locks, stops, or otherwise is disposed against at least a portion of the variation region 16, which minimizes relative movement (or creep) in at least one direction between the fiber 10 and the ferrule 30. Also, although the fiber 10 and ferrule 30 are shown herein as being oriented horizontally, the invention will work independent of the orientation of the fiber 10 and the ferrule 30, e.g., vertical, horizontal, or any other orientation.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for attaching to an optical fiber, comprising:
   an optical fiber, comprising:
      a core; and
      a cladding disposed outside of said core;
   said fiber having a variation of an outer dimension of said cladding;
   a structure, disposed against at least a portion of said variation, which minimizes relative movement in at least one axial direction between said fiber and said structure;
   said fiber being held in tension against said structure; and
   said fiber extending axially from opposite axial ends of said structure.

2. The apparatus of claim 1 wherein said variation comprises an expanded region.

3. The apparatus of claim 1 wherein said variation comprises a recessed region.

4. The apparatus of claim 1 wherein said structure comprises a ferrule.

5. The apparatus of claim 4 further comprising a housing adjacent to said ferrule.

6. The apparatus of claim 1 wherein said structure comprises an inner coating adjacent to said fiber.

7. The apparatus of claim 1 wherein said structure comprises a housing.

8. The apparatus of claim 1 wherein said structure is bonded to said cladding.

9. The apparatus of claim 1 wherein said structure comprises a geometry that substantially conforms to at least a portion of said variation.

10. The apparatus of claim 1 wherein said structure overlaps at least a portion of said variation.

11. The apparatus of claim 1 wherein said structure overhangs at least a portion of said variation.

12. The apparatus of claim 1 wherein said fiber further comprises a buffer layer between said structure and said cladding.

13. The apparatus of claim 12 wherein said structure is bonded to said buffer layer.

14. The apparatus of claim 12 wherein said buffer layer comprises a metal layer.

15. The apparatus of claim 14 wherein said metal layer comprises Ni and Au.

16. The apparatus of claim 12 wherein said buffer layer comprises a polymer layer.

17. The apparatus of claim 1 wherein said variation comprises a bulge.

18. The apparatus of claim 1 wherein said structure comprises more than one piece.

19. The apparatus of claim 1 wherein said structure comprises a collar which holds the structure against said fiber.

20. The apparatus of claim 1 wherein said structure is detachably disposed against said variation.

21. A method for attaching to an optical fiber, comprising the steps of:
   (a) providing an optical fiber having a core and a cladding disposed outside of said core and said fiber having a variation of an outer dimension of said cladding; and
   (b) placing a structure against at least a portion of said variation so as to minimize relative movement in at least one axial direction between said fiber and said structure; said fiber being held in tension against said structure and said fiber extending axially from opposite axial ends of said structure.

22. The method of claim 21 wherein said fiber further comprises an outer buffer layer between said structure and said cladding.

23. The method of claim 21 wherein said structure comprises a ferrule.

24. The method of claim 21 wherein said structure comprises more than one piece.

25. The method of claim 21 wherein said structure comprises a collar which holds said structure against said fiber.

26. The method of claim 25 wherein said collar comprises a heat shrinking material.

27. The method of claim 21 wherein said structure comprises a housing.

28. The method of claim 21 wherein said placing step comprises crimping said structure around at least a portion of said variation.

29. The method of claim 21 wherein said placing step comprises heating said structure and applying pressure to said structure to force the structure to conform to said variation.

30. The method of claim 21 wherein said placing step comprises heating said structure and pulling said fiber to force the structure to conform to said variation.

31. The method of claim 21 wherein said variation comprises a bulge.

32. The method of claim 21 wherein said structure is detachably disposed against said variation.

33. An apparatus for holding an optical fiber in tension, comprising:
   an optical fiber, comprising:
      a core; and
      a cladding disposed outside of said core;
   said fiber having a variation of an outer dimension of said cladding;
   a structure, disposed against at least a portion of said variation so as to minimize relative movement in at least one axial direction between said fiber and said structure;
   said fiber being held in tension against said structure; and
   said fiber extending axially from opposite axial ends of said structure.

34. The apparatus of claim 33 wherein said variation comprises an expanded region.

35. The apparatus of claim 33 wherein said variation comprises a recessed region.

36. The apparatus of claim 33 wherein said structure comprises a ferrule.

37. The apparatus of claim 36 further comprising a housing adjacent to said ferrule.

38. The apparatus of claim 33 wherein said structure comprises an inner coating adjacent to said fiber.

39. The apparatus of claim 33 wherein said structure comprises a housing.

40. The apparatus of claim 33 wherein said structure is bonded to said cladding.

41. The apparatus of claim 33 wherein said structure comprises a geometry that substantially conforms to at least a portion of said variation.

42. The apparatus of claim 33 wherein said structure overlaps at least a portion of said variation.

43. The apparatus of claim 33 wherein said structure overhangs at least a portion of said variation.

44. The apparatus of claim 33 wherein said fiber further comprises a buffer layer between said structure and said fiber.

45. The apparatus of claim 44 wherein said structure is bonded to said buffer layer.

46. The apparatus of claim 44 wherein said buffer layer comprises a metal layer.

47. The apparatus of claim 46 wherein said metal layer comprises Ni and Au.

48. The apparatus of claim 44 wherein said buffer layer comprises a polymer layer.

49. The apparatus of claim 33 wherein said structure comprises more than one piece.

50. The apparatus of claim 33 wherein said structure comprises a collar which holds the structure against said fiber.

51. The apparatus of claim 33 wherein said variation comprises a bulge.

* * * * *